(12) United States Patent
Fitzgerald et al.

(10) Patent No.: US 11,427,379 B2
(45) Date of Patent: Aug. 30, 2022

(54) MODULAR PALLET SYSTEM

(71) Applicants: Thomas M Fitzgerald, Havertown, PA (US); David D McClanahan, Harleysville, PA (US); Mark G'Francisco, Knoville, TN (US)

(72) Inventors: Thomas M Fitzgerald, Havertown, PA (US); David D McClanahan, Harleysville, PA (US); Mark G'Francisco, Knoville, TN (US)

( * ) Notice: Subject to any disclaimer, the term of this patent is extended or adjusted under 35 U.S.C. 154(b) by 0 days.

(21) Appl. No.: 17/176,266

(22) Filed: Feb. 16, 2021

(65) Prior Publication Data

US 2021/0323725 A1 Oct. 21, 2021

Related U.S. Application Data

(60) Provisional application No. 62/976,934, filed on Feb. 14, 2020.

(51) Int. Cl.
*B65D 19/18* (2006.01)
*B65D 19/38* (2006.01)
*B65D 19/04* (2006.01)

(52) U.S. Cl.
CPC ............ *B65D 19/18* (2013.01); *B65D 19/04* (2013.01); *B65D 19/385* (2013.01); *B65D 2519/008* (2013.01); *B65D 2519/00034* (2013.01); *B65D 2519/00069* (2013.01); *B65D 2519/00174* (2013.01); *B65D 2519/00268* (2013.01);

(Continued)

(58) Field of Classification Search
CPC ........ B65D 19/04; B65D 19/06; B65D 19/18; B65D 2519/00268; B65D 2519/00587; B65D 2519/00746; B65D 2519/008; B65D 2519/00995
See application file for complete search history.

(56) References Cited

U.S. PATENT DOCUMENTS 3,131,829 A * 5/1964 Masser .............. B65D 21/0204
                                                        206/144
3,650,224 A * 3/1972 Petix .................. B65D 19/0075
                                                        108/54.1

(Continued)

FOREIGN PATENT DOCUMENTS

CA      2958971 A1 *  8/2017  ........... B65D 19/385
EP      3290621 A1 *  3/2018  ......... E04H 12/2238

(Continued)

*Primary Examiner* — Daniel J Rohrhoff
(74) *Attorney, Agent, or Firm* — Invention To Patent Services; Alex Hobson

(57) ABSTRACT

A modular pallet system utilizes a plurality of modular pallets that are configured to engage along sides of the pallet to form an interconnected array of coupled pallets that may be moved by a pallet truck and wherein the individual pallets are configured for detachment and transport with a hand-truck. A quad array of coupled pallets may be formed that is about a conventional pallet size and configured to receive the two forks of a fork truck into fork truck openings. One of the modular pallets of the quad array of coupled pallets may be disengaged or disconnected by use of a hand-truck, wherein the tongue of the hand-truck extends in the fork truck opening between the feet of a pallet and engages with hand-truck notches configured on feet. An interconnecting feature of a modular pallet may include a dovetail and dovetail recess.

20 Claims, 17 Drawing Sheets

(52) U.S. Cl.
CPC .............. *B65D 2519/00587* (2013.01); *B65D 2519/00746* (2013.01); *B65D 2519/00796* (2013.01); *B65D 2519/00955* (2013.01)

(56) References Cited

U.S. PATENT DOCUMENTS

| | | | | |
|---|---|---|---|---|
| 3,851,936 | A * | 12/1974 | Muller | F16B 12/20 312/108 |
| 4,253,570 | A * | 3/1981 | O'Connor | B65D 85/04 206/386 |
| 4,895,080 | A * | 1/1990 | Thomas | B65D 19/38 108/56.1 |
| 5,769,376 | A * | 6/1998 | Bostic | B65D 81/261 108/55.1 |
| 5,988,394 | A * | 11/1999 | Emoto | B65D 21/0204 206/562 |
| 6,418,861 | B1 * | 7/2002 | Flam | B65D 19/0059 108/56.1 |
| 7,334,529 | B1 * | 2/2008 | Liao | B65D 19/0018 108/57.26 |
| 8,596,207 | B2 * | 12/2013 | Dubois | B65D 19/0014 108/57.26 |
| 8,814,110 | B2 * | 8/2014 | Crager | B65D 19/0002 248/146 |
| 9,919,835 | B2 * | 3/2018 | Brisendine | B65D 19/38 |
| 2012/0298014 | A1 * | 11/2012 | Wilson | B65D 19/0016 108/53.1 |
| 2014/0360120 | A1 * | 12/2014 | Brisendine | E04F 15/02405 52/582.1 |
| 2019/0144163 | A1 * | 5/2019 | Lim | B65D 19/385 108/53.5 |

FOREIGN PATENT DOCUMENTS

| | | | | |
|---|---|---|---|---|
| GB | | 2395188 A * | 5/2004 | ............. B60D 1/483 |
| WO | WO-2008022380 A1 * | | 2/2008 | ......... B65D 19/0051 |

* cited by examiner

MODULAR PALLET SYSTEM

CROSS REFERENCE TO RELATED APPLICATIONS

This application claims the benefit of priority 62/976,934, filed on Feb. 14, 2020; the entirety of which is hereby incorporated by reference herein.

BACKGROUND OF THE INVENTION

Field of the Invention

The invention relates a modular pallet system including a plurality of pallets that are configured to engage along sides of the pallet to form a larger, interconnected array of coupled pallets that may be moved by a pallet truck and wherein the individual pallets are configured for detachment and transport with a hand-truck.

Background

Shipping, warehousing and transporting products and materials on pallets produces some obstacles when a portion of the load on the pallet needs to be separated from the other items on the pallet for warehousing or transportation. The products have to be manually moved from the pallet and moved manually or with a hand-truck or cart for example. In addition, some passageways are not large enough to accommodate a pallet, which may be about 40 inches wide or more, and therefore, products must be manually moved from the pallet for transport trough these passageways. This is time consuming and can lead to injury from manually moving and/or carrying the products.

SUMMARY OF THE INVENTION

The invention is directed to a modular pallet system including a plurality of pallets that are configured to engage along sides of the pallet to form a larger, interconnected array of coupled pallets that may be moved by a pallet truck and wherein the individual pallets are configured for detachment and transport with a hand-truck. In an exemplary embodiment, the pallet platforms are square and a quad array of coupled pallets can be formed to produce a quad array of coupled pallets that is about a conventional pallet size and wherein the two forks of a fork truck are configured to extend in fork truck openings, formed between feet of the individual modular pallets, of adjacent interconnect pallets. The extended ends of the two forks may extend from a first modular pallet, proximal the fork truck to an interconnected modular pallet distal the fork truck. This quad array of coupled pallets may be moved by the fork truck in a secure manner. One of the modular pallets of the quad array of coupled pallets may be disengaged or disconnected by use of a hand-truck, wherein the tongue of the hand-truck extends in the fork truck opening between the feet of a pallet and engages with hand-truck notches configured on feet. The hand-truck notches are configured to enable an individual modular pallet to be separated from an array of coupled pallets with the hand-truck. Tilting the hand-truck back lifts the modular pallet up from the quad array of modular pallets to disconnect the modular pallet. This versatile configuration and detachable interconnection provides useful benefits for sorting, transporting items on the modular pallets. A single modular pallet may be moved by a hand-truck more easily through narrow passage ways. In addition, an array of coupled pallets may be formed as required with various items on each modular pallet to complete an order for shipment, for example.

An exemplary modular pallet comprises an interlocking feature on at least one side of the pallet and may have interlocking features on two or all four sides of the modular pallet. The interlocking features may be on opposing sides, thereby enabling a line of interconnected pallets, or may be on adjacent sides, thereby enabling a quad array of coupled pallets. An exemplary modular pallet, or the platform, is rectangular in shape wherein it has opposing pairs of parallel sides that extend at right angles from each other. An exemplary rectangular modular pallet may be square, wherein each of the sides are equal length. In an exemplary embodiment, each side of the pallet has an interlocking feature thereby enabling a quad array of coupled pallets and versatility in interconnection. It may be desirable to have one side, the exposed outside side of the pallet, when interconnected to be void of interconnecting features, as the interconnecting feature may more likely unintentionally catch on objects during transport. An exemplary modular pallet may be a two-sided interconnecting modular pallet having an interconnecting feature on only two of the side of the modular pallet, such as on opposing sides or on adjacent sides, wherein the interconnecting features are orthogonal to each other.

An exemplary modular pallet has a platform for carrying products or items thereon. The platform may be an open platform having open cells, or apertures therethrough or a grid pattern, for example, to reduce the weight of the modular pallet and to allow liquid and debris to pass through the pallet platform. The top surface of the pallet platform may be planar to allow object to be slid easily into position thereon and to enable stacking of one modular pallet atop another modular pallet. An exemplary modular pallet may be of a size to enable the single modular pallet to be moved through conventional doorways, wherein the length of the sides is no more than about 36 inches, or no more than about 30 inches, or no more than about 24 inches and any range between and including the pallet length values provided. As described herein, a single modular pallet may be sized such that a quad array of modular pallets forms a conventionally sized pallet, or about a pallet that is square having side length dimensions from about 40 inches to about 50 inches, or more preferably from about 42 inches to about 48 inches. Again, the fork-truck opening of adjacent pallets in a quad array of coupled pallets that is conventionally sized may be configured to receive the forks of a conventional fork truck, for transport.

An exemplary modular pallet is configured with feet that extend down from the pallet platform proximal to the corners of the modular pallet. An exemplary foot produces the fork-truck opening from the base of the feet to the bottom of the platform. The feet may also be configured with the hand-truck notch that is configured around the base of the feet, thereby forming a hand-truck extension that extends horizontally from the foot to receive and engage with the top surface of a hand-truck tongue. The hand-truck extension is raised up from the base of the foot and this configuration enables better engagement and disengagement of the modular pallet with another modular pallet, and provides for more secure transport with the hand-truck.

An exemplary modular pallet has an interconnecting feature on one or more sides that may include a dovetail array, having at least one dovetail and at least one dovetail recess. The interconnecting feature must be offset an offset distance from the center of the pallet, or pallet side to enable interconnection with modular pallets having the same interconnecting feature, whereby the sides of the two interconnect pallets are aligned after being interconnected. An exemplary dovetail array may include two dovetails and two dovetail recesses and may also require a partial dovetail and partial dovetail recess on opposing sides of the dovetail array. A dovetail has a connected end, connected with the pallet or pallet platform and an extended end that is flared out from the connected end. In an exemplary embodiment, the dovetail extends from the top surface of the platform and extends down a depth from the platform top surface. The sides of the platform may have a side extension that extends down from the dovetail array and this side extension may help to align the sides of pallets during connecting the pallets with the dovetail array.

Exemplary modular pallets may be configured for stacking one atop another, wherein the feet are configured with foot wells to receive the foot of a pallet stack thereon. Also, the platforms may be configured to rest one atop another when the modular pallets are stacked to provide additional structural support.

An exemplary modular pallet is a monolithic part made from a single material such as being molded. An exemplary modular pallet may be injection molded or rotomolded out of plastic, for example.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
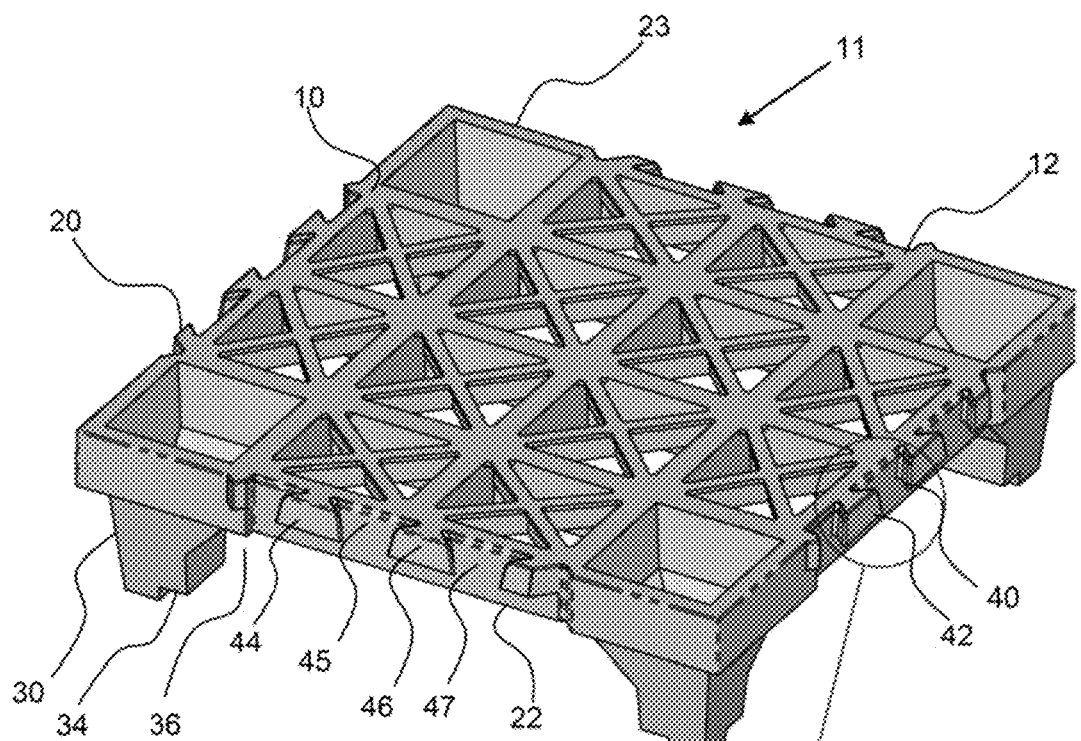
FIG. 1 shows a perspective view of an exemplary modular pallet of a modular pallet system, having an interlocking feature comprises of a dovetail array.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
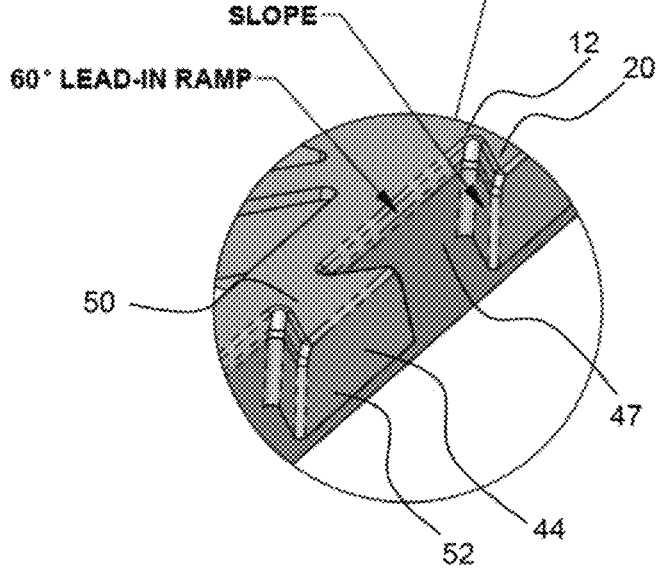
FIG. 2 shows an enlarged view of a portion of the dovetail array having a dovetail and a dovetail recess.

Referring now to FIGS. 1 and 2, an exemplary modular pallet 10 of a modular pallet system 11, has an interlocking feature 40 comprised of a dovetail array 42. The dovetail array may extend out from the side 23 of the platform 12. The dovetail array has a first dovetail recess 45 configured between a first dovetail 44 and a second dovetail 46 and a second dovetail recess 47. Each of the dovetails taper from an extended end 52 toward a connected end 50, connected to the pallet platform 12. As shown in FIG. 2, the dovetail recess expands in dimension toward the platform, or tapers as it extends from the platform. The second dovetail recess 47 is tapered from the top of the platform 20 in a taper angle from vertical. This tapering recess more securely engages with the dovetail when it is inserted down into the dovetail recess. Also note that the dovetail may be flared from the top of the dovetail toward the bottom of the dovetail, which may be a result of two tapered dovetail recess configured on either side.

Feet 30 are configured at the corners of the platform and extend down to a foot base 32. Each foot has a hand truck notch 34 configured to receive a hand truck tongue for lifting the modular pallet and for disengaging a modular pallet from a nested pallet array. A fort truck opening 36 is formed between the bottom of the platform 22 and the foot base 32.

Figure 3:
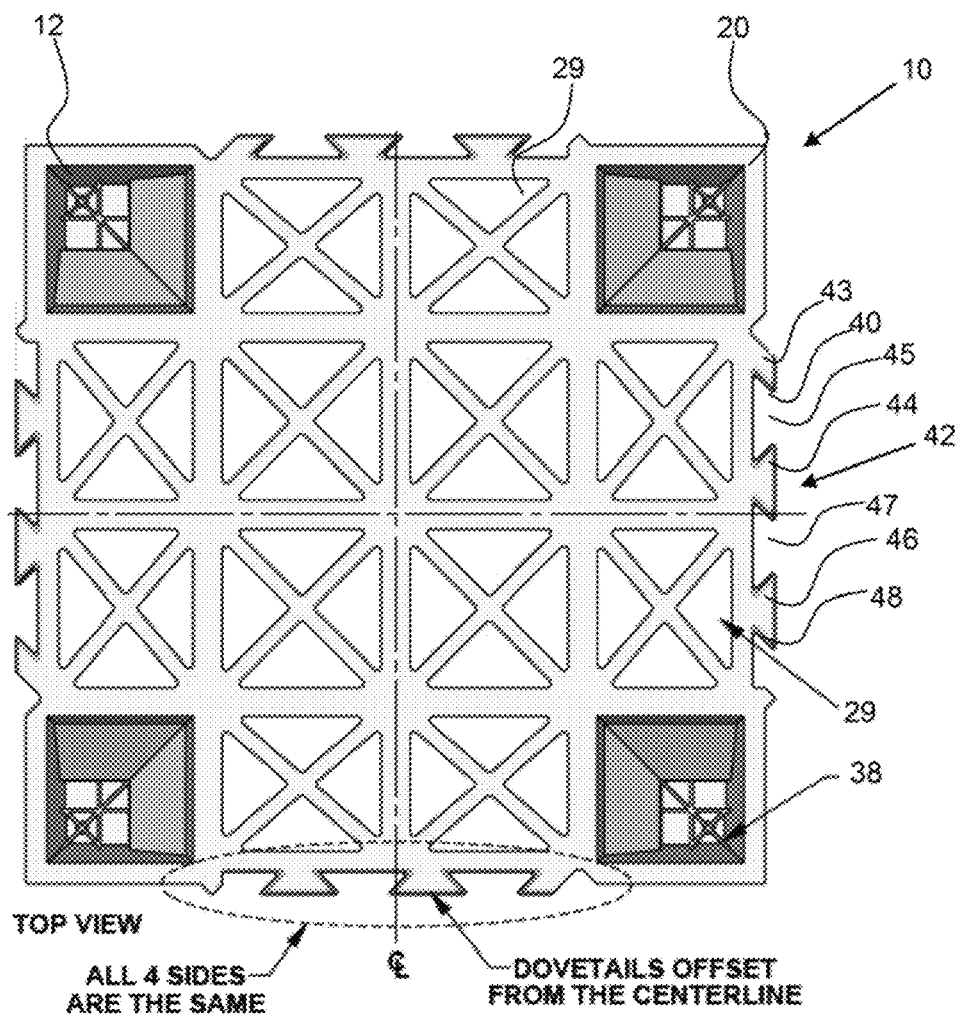
FIG. 3 shows a top view of an exemplary modular pallet having open cells extending through the platform.

As shown in FIG. 3, an exemplary modular pallet 10 has a platform 12 with apertures 29 or openings extending therethrough. The exemplary platform is square in shape with feet configured proximal to the corners. The feet form foot wells 38, forming conduits extending down from the top 20 of the platform and have drain hole in the bottom.

Figure 4:
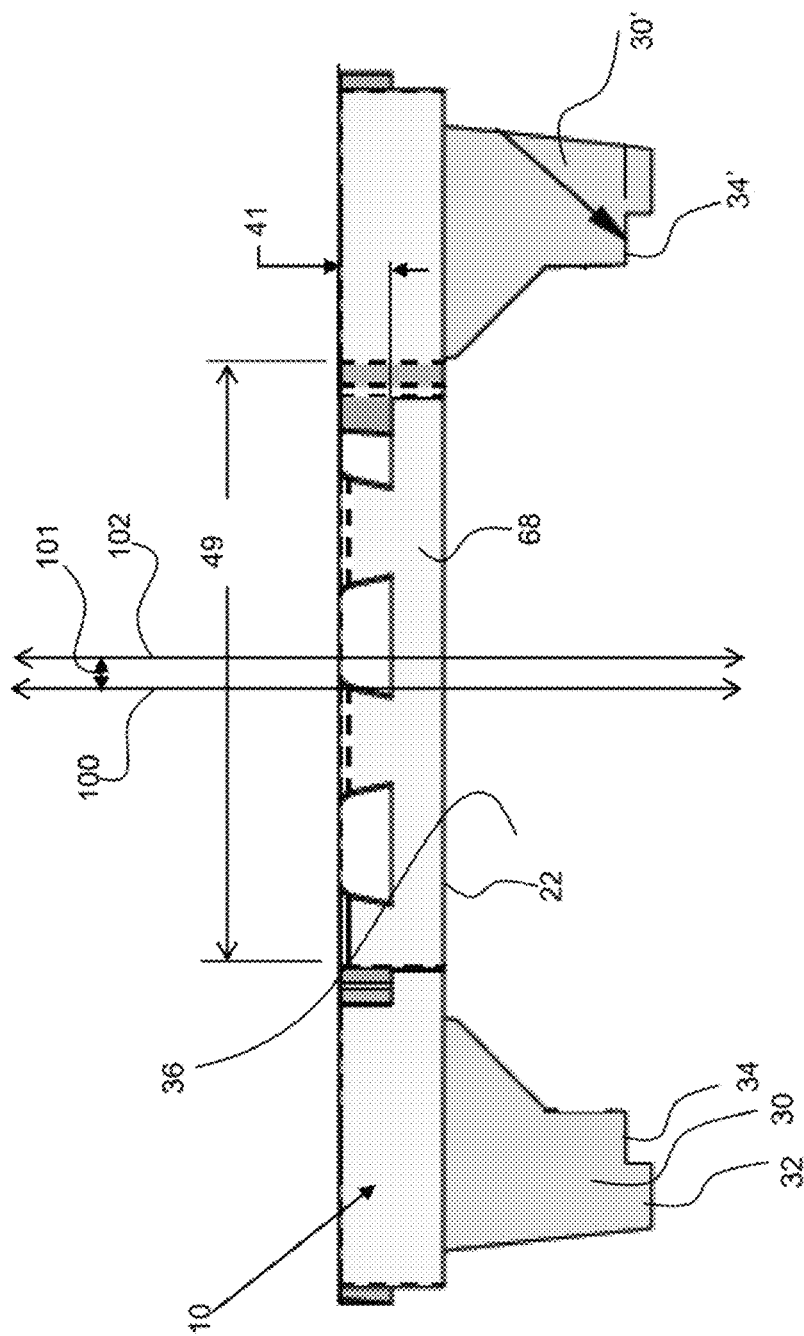
FIG. 4 shows a side view of an exemplary modular pallet having feet extending down from the platform, wherein the feet have a hand truck notch for receiving the tongue of a hand truck and wherein a fork truck opening is configured between the bottom of the platform and the base of the feet.

As shown in FIG. 4, an exemplary modular pallet 10 has feet 30, 30' extending down from the platform 12, wherein the feet have a hand truck notch 34 for receiving the tongue of a hand truck and wherein a fork truck opening 36 is configured between the bottom 22 of the platform and the base of the feet 32. The hand truck notch 34 extends from the foot base 32 up and from an inside surface of the foot outward to accommodate and secure the hand truck tongue therein. Also shown in FIG. 4 is the depth of the dovetail array 41, wherein a side extension 68, which may be a planar surface, extends down from the dovetail array. This planar side extension may aid in alignment of pallets for engagement of their respective dovetail arrays with each other. When two pallets are somewhat inaccurately brought together, the sides of the pallet help align the details by not allowing them to overshoot engagement before being lowered into engagement. Furthermore, the offset distance 101 of the dovetail array is shown along with the pallet side center 100 line and the dovetail array center 102 line. As described herein, the alignment of the pallets with the same dovetail array requires the dovetail arrays to be offset from the pallet side center, as shown.

Figure 5:
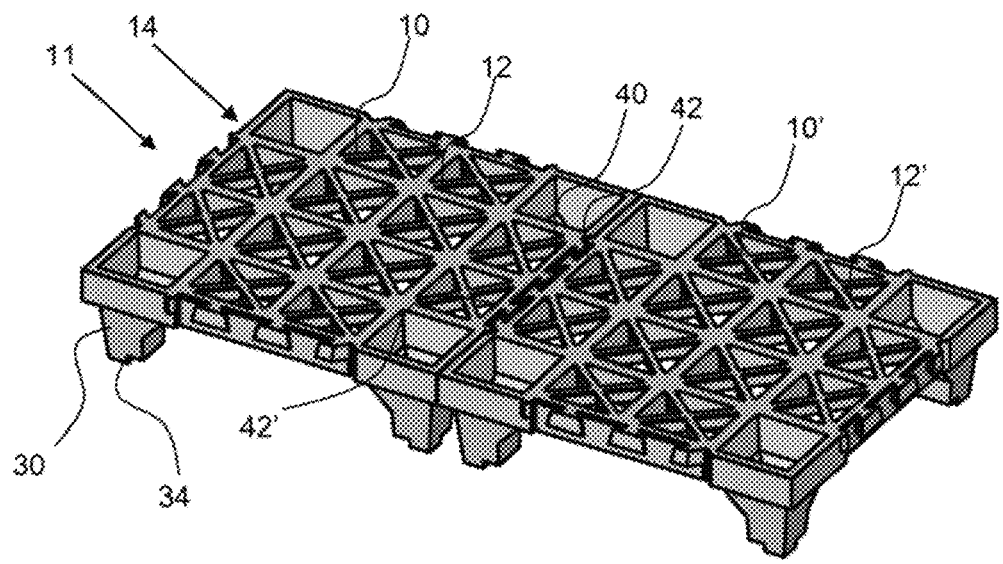
FIG. 5 shows a perspective view of an exemplary modular pallet system having two modular pallets coupled together by the interlocking features therebetween.

As shown in FIG. 5, an exemplary modular pallet system 11 has two modular pallets 10, 10' coupled together by the interlocking features 40 therebetween. The two dovetail arrays 42, 42' are engaged with each other retain the two modular pallets in a dual array of coupled pallets 14.

Figure 6:
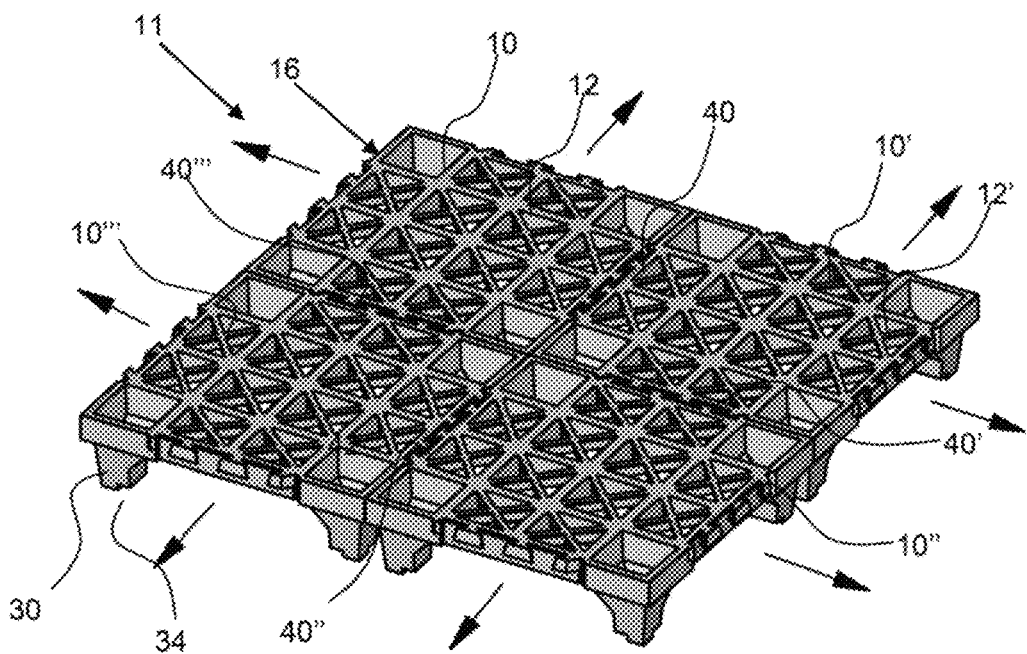
FIG. 6 shows a perspective view of an exemplary modular pallet system having four modular pallets coupled together by the interlocking features therebetween.

As shown in FIG. 6 an exemplary modular pallet system 11 has four modular pallets 10-10''' coupled together by the interlocking feature 40-40''' therebetween. The dovetail arrays are engaged with each other to retain the four modular pallets in a quad array of coupled pallets 16.

Figure 7:
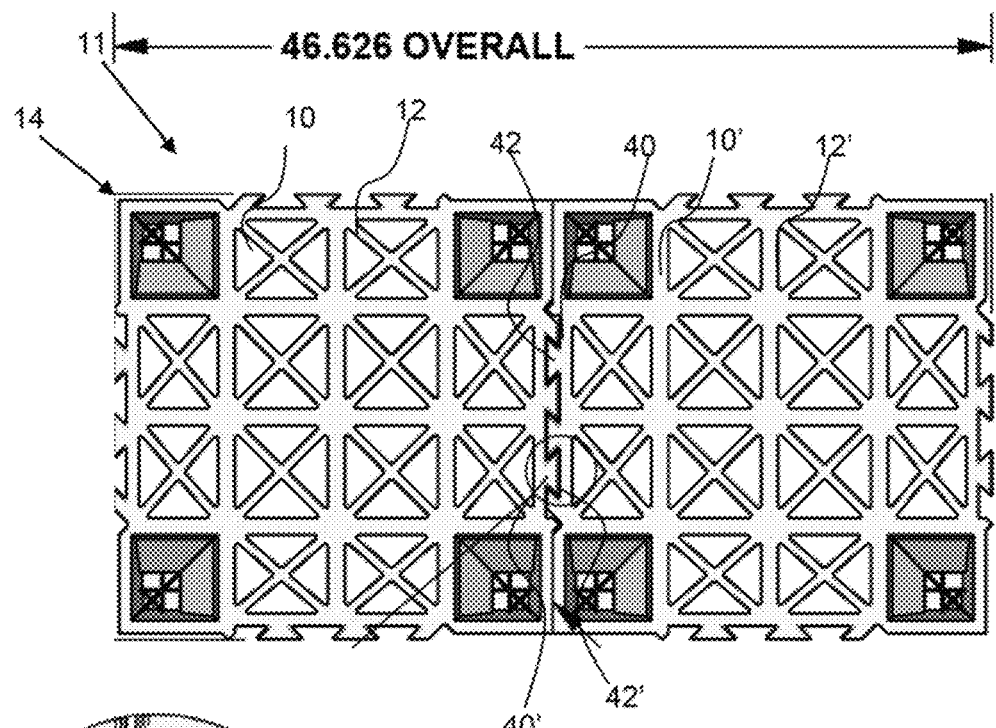
FIG. 7 shows a top view of an exemplary modular pallet system having two modular pallets coupled together by the interlocking features therebetween.
Figure 8:
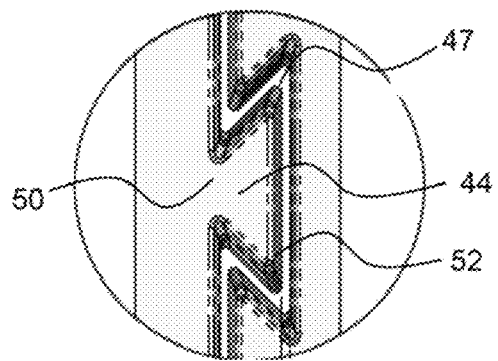
FIG. 8 shows an enlarged top view of a portion of the two modular pallets interconnection, or the dovetail array.

As shown in FIG. 7, an exemplary modular pallet system 11 has two modular pallets coupled together by the interlocking features 40, 40', a dovetail array 42.42'. As shown in FIG. 8, the first dovetail 44 of the first modular pallet 10 is configured within the second dovetail recess 47 of the second modular pallet 10'. The first dovetail 44 tapers from the extended end 52 to the connected end 50, connected to the platform.

Figure 9:
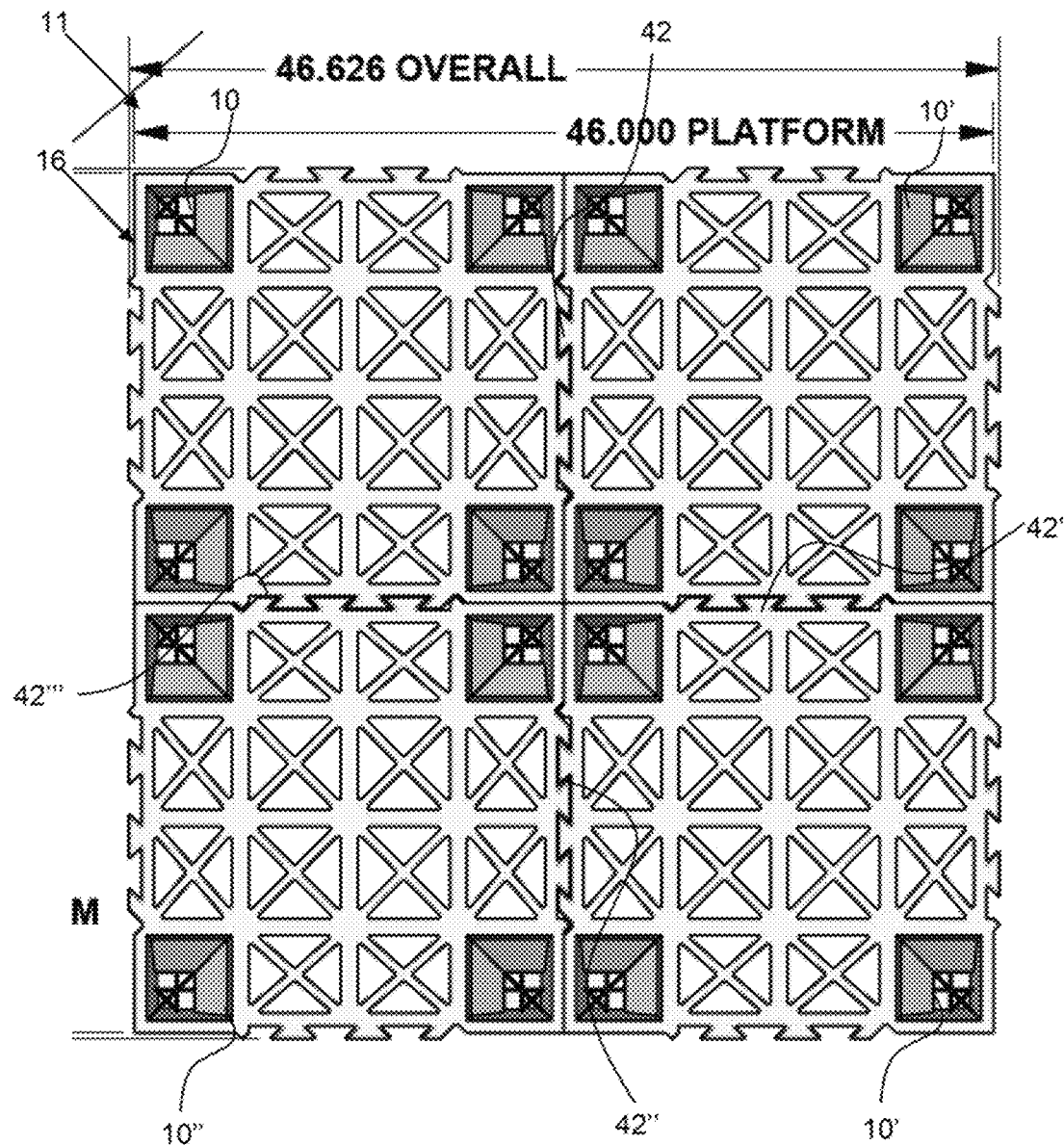
FIG. 9 shows a top view of an exemplary modular pallet system having four modular pallets coupled together by the interlocking features therebetween.

As shown in FIG. 9, an exemplary modular pallet system 11 has four modular pallets 10-10''' coupled together by the dovetail arrays 42-42''' therebetween. This configuration is a quad array of coupled pallets 16.

Figure 10:
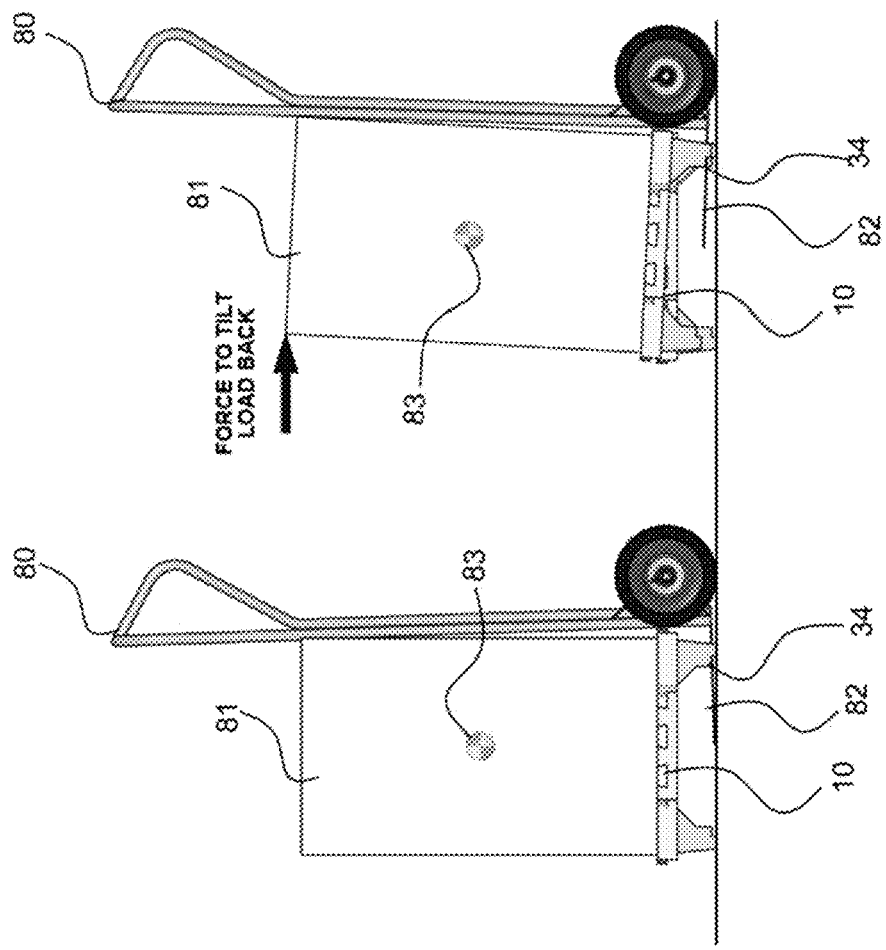
FIG. 10 shows a side view of an exemplary modular pallet being lifted by a hand truck.

As shown in FIG. 10, an exemplary modular pallet 10 is being lifted by a hand truck 80. A force may be required to tilt the modular pallet 10 and package 81 configured thereon back against the hand truck. The center of gravity of the package 83 is offset an offset distance 84 from the point of contact of the hand truck tongue with the modular pallet, or to be more specific, with the hand truck notch 34.

Figures 11, 12:
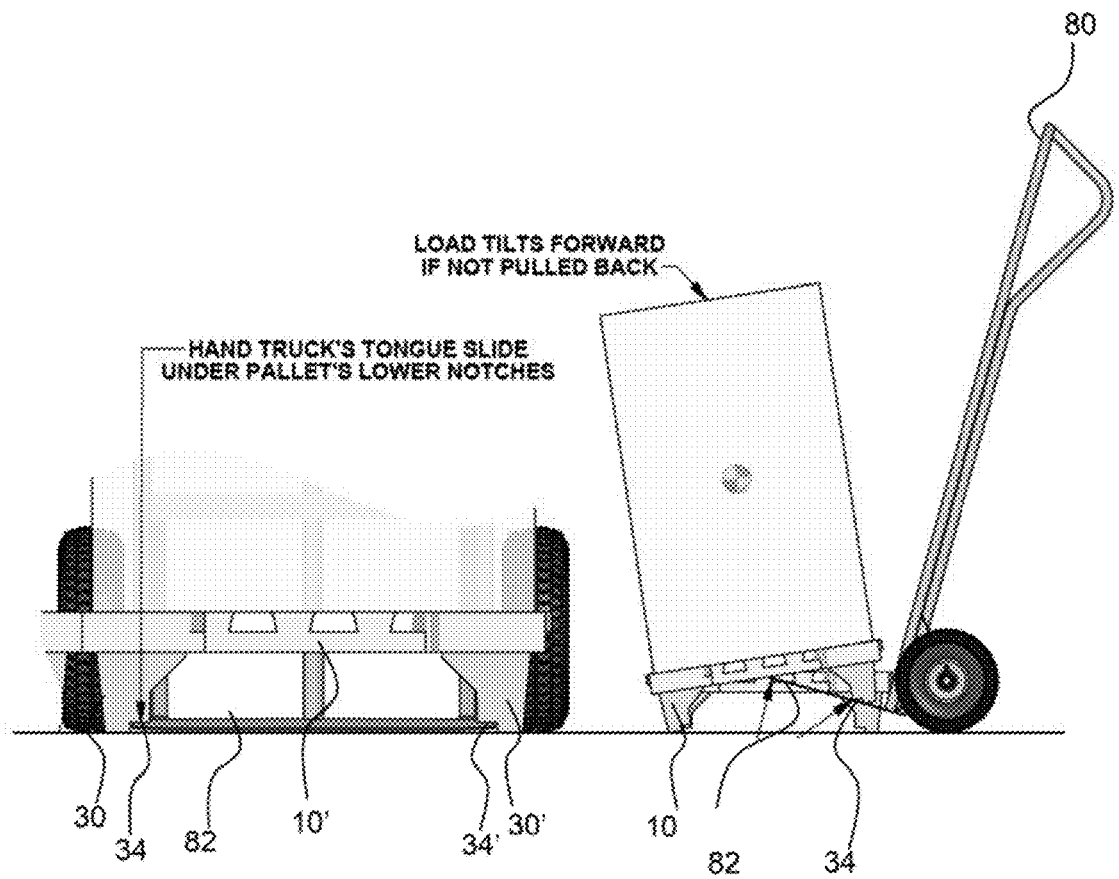
FIG. 11 shows a front view of a modular pallet being lifted by a hand truck.
FIG. 12 shows a side view of an exemplary modular pallet being lifted by a hand truck, wherein the package on the modular pallet is not being pushed back toward the hand truck.

Referring now to FIGS. 11 and 12, a modular pallet 10 is configured for being lifted and transported with a hand truck 90. The hand truck tongue 82 is configured in the hand truck notch 34, 34' of two opposing feet 30, 30' on one side of the modular pallet. As shown in FIG. 12, the hand tuck is being lifted back and the side of the modular pallet closest to the hand truck, the lift side, is being raised to tilt the modular pallet away from the hand truck tongue 82. Again, a force may be required to force the package and pallet into alignment with the hand truck, to prevent this tilting.

Figure 13:
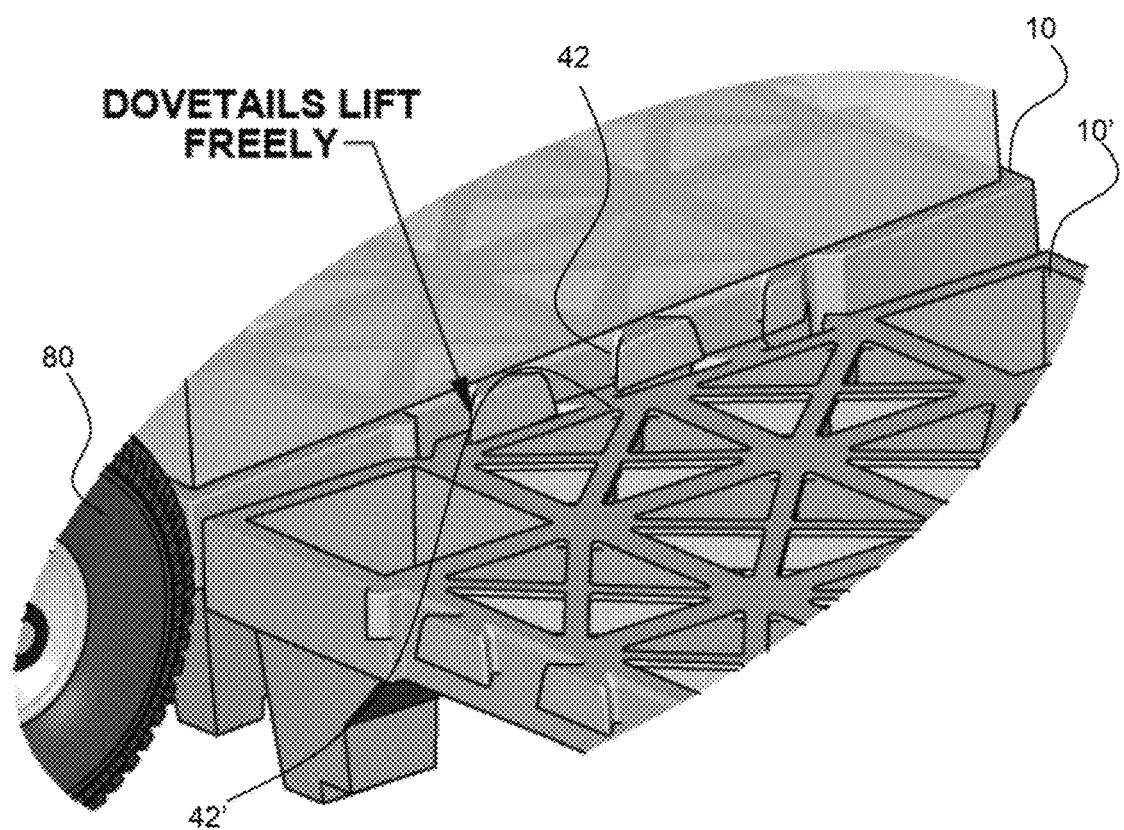
FIG. 13 shows a perspective view of one modular pallet being disengaged from a second modular pallet using a hand truck.

As shown in FIG. 13, a first modular pallet 10 is being disengaged from a second modular pallet 10' using a hand truck 80. The dovetail array 42 of the first modular pallet 10 is being lifted up and out of the dovetail array 42' of the second modular pallet.

Figure 14:
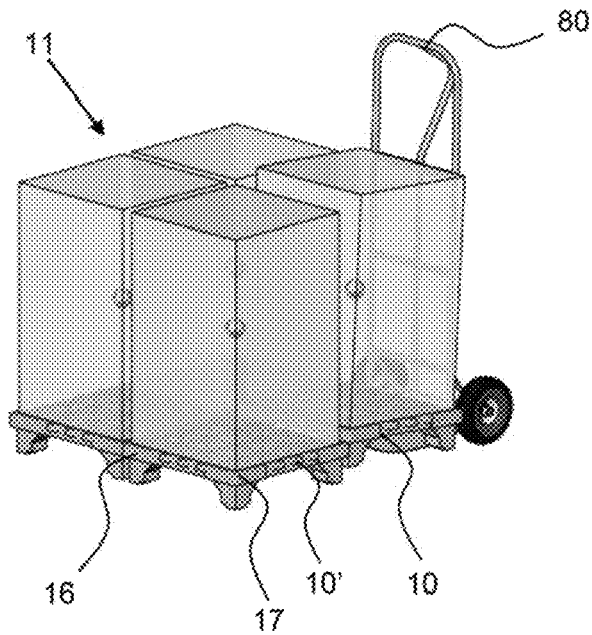
FIG. 14 shows perspective view a modular pallet system comprising four modular pallets coupled together with one of the modular pallets being disengaged from quad array of modular pallets using a hand truck.

As shown in FIG. 14, a modular pallet 10, is being engaged with a nested pallet array 17 to form a quad array of pallets 16 having four modular pallets coupled together. The four individual modular pallets may be configured in the quad array of pallets 16 for transport by a fork truck, as shown in FIG. 15.

Figure 15:
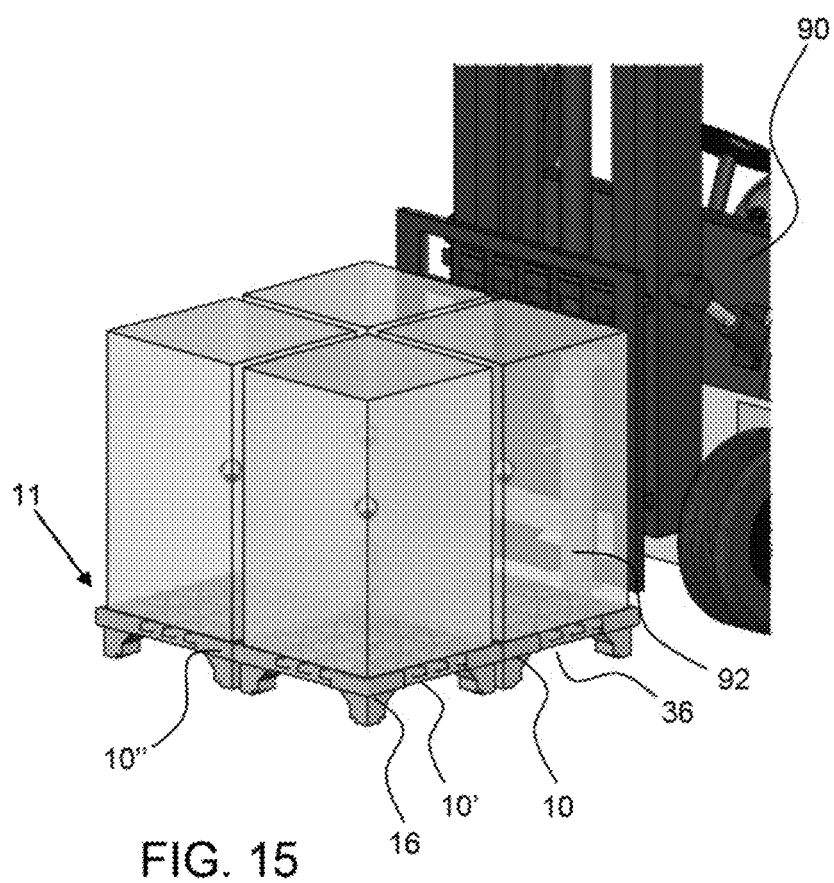
FIG. 15 shows a perspective view a modular pallet system comprising four modular pallets coupled together and being lifted by a fork truck.

As shown in FIG. 15, a modular pallet system 11 is configured in a quad array of pallets 16 having four modular pallets coupled together and is being lifted by a fork truck 90. The forks 92 of the fork truck are extending in the fork truck opening 36 under each of the four modular pallets.

Figure 16:
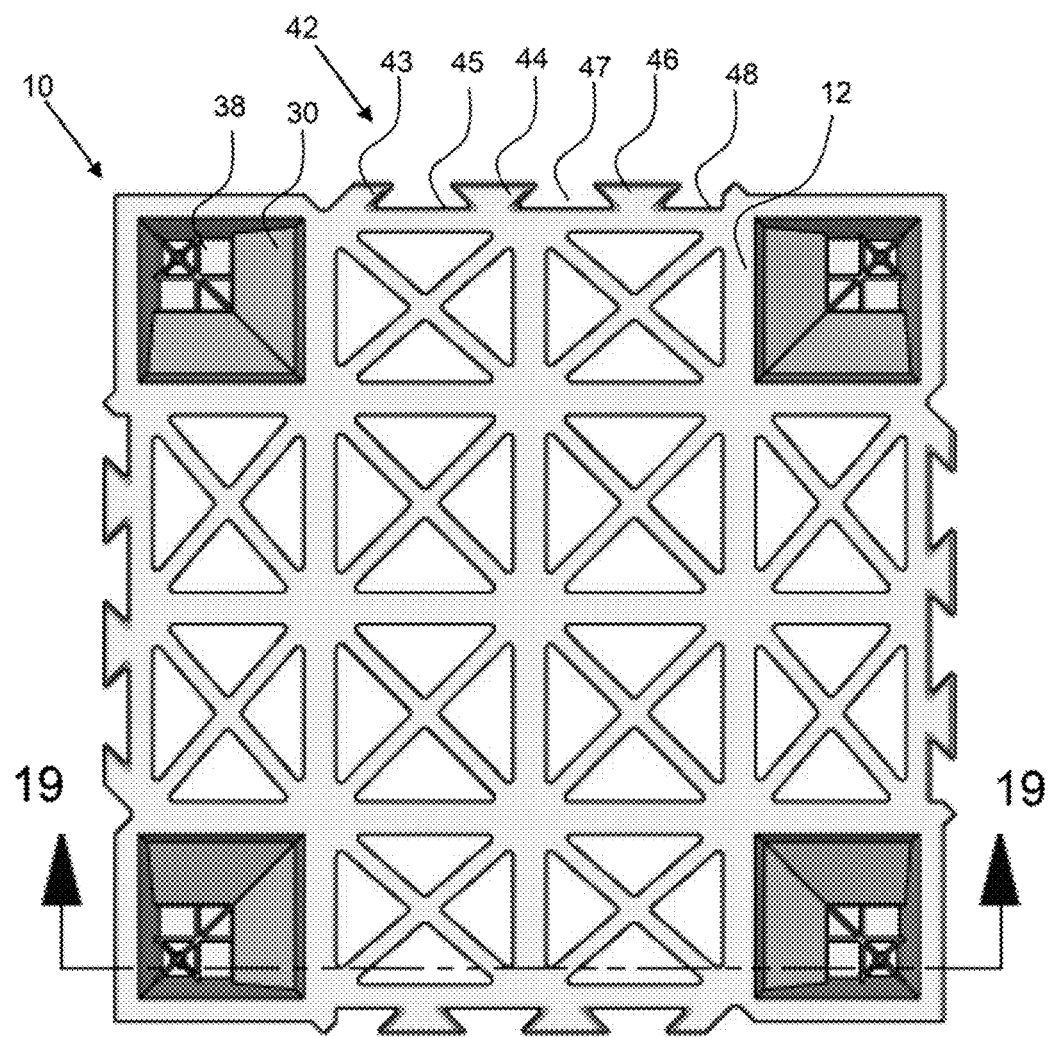
FIG. 16 shows a top view of the pallet and the pallet platform as well as the foot wells extending down from the platform into the fee.
Figure 17:
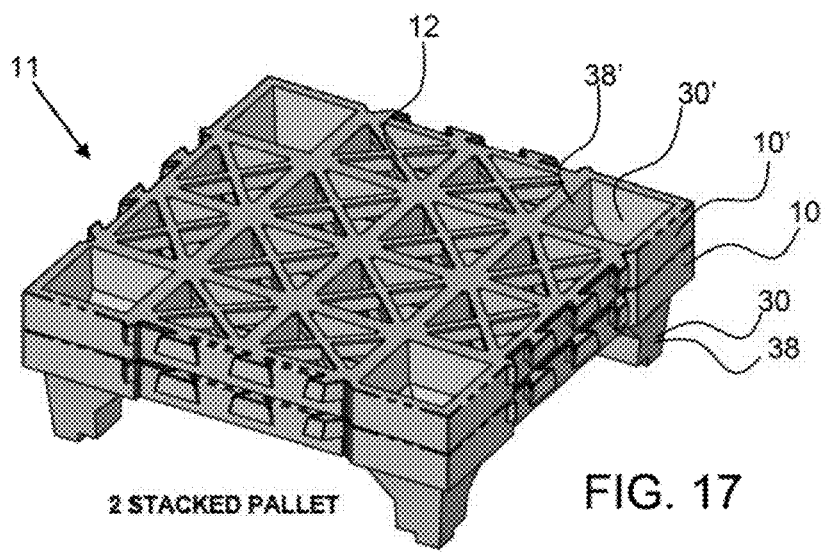
FIG. 17 shows a perspective view of two modular pallets stack one atop another to form a set of stacked modular pallets.

As shown in FIG. 16, a modular pallet 10 has a pallet platform 12 having four feet 30 configured proximal to the corners of the square modular pallet platform. The feet have a foot well 38 and apertures in the bottom of the wells to allow any liquid or debris to pass through the foot. These foot wells enable stacking of one modular pallet on top of another. The platform 12 is an open platform having a grid pattern to reduce weight and to allow liquid and debris to pass through the platform.

Figure 18:
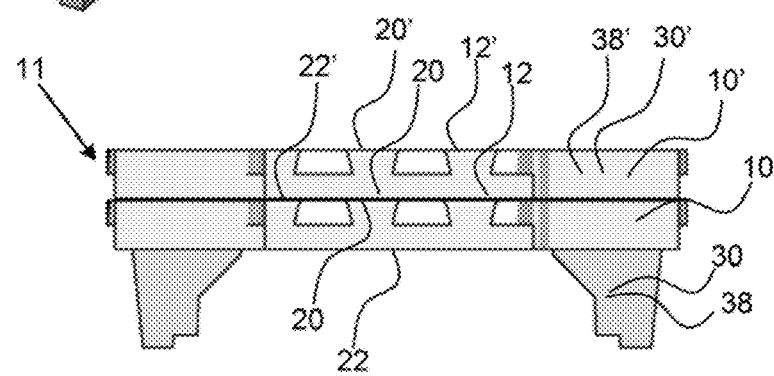
FIG. 18 shows a side view of two modular pallets stack one atop another to form a set of stacked modular pallets.

Referring now to FIGS. 17 to 21, a modular pallet system 11 is configured for stacking of one modular pallet 10' atop another modular pallet 10 to form a set of stacked modular pallets. As shown in FIG. 18, the bottom of the platform 22' of the top modular pallet 10' is planar with and may rest on the top of the platform 20 of the bottom modular pallet 10.

This configuration provides strength and rigidity of the stacked modular pallets. The platforms may be planar to enable this stacking configuration.

Figure 19:
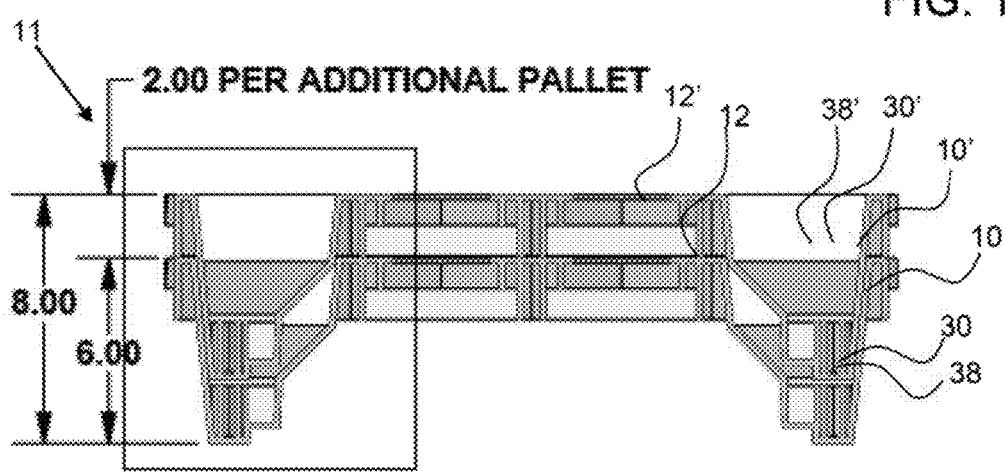
FIG. 19 shows a cross-sectional view taken along line 19-19 of FIG. 16, of two modular pallets stack one atop another to form a set of stacked modular pallets.
Figure 20:
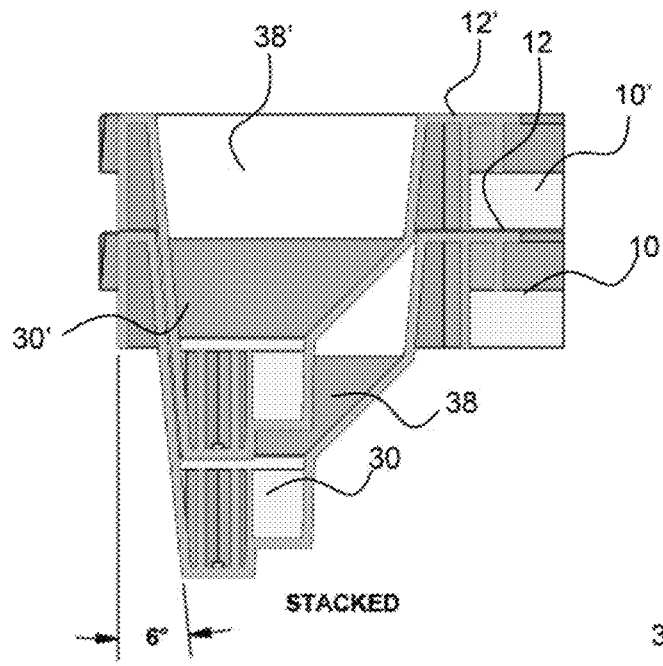
FIGS. 20 and 21 show an enlarged cross-sectional view of the foot of the top modular pallet extending down into the foot well of the bottom modular pallet.
Figure 21:
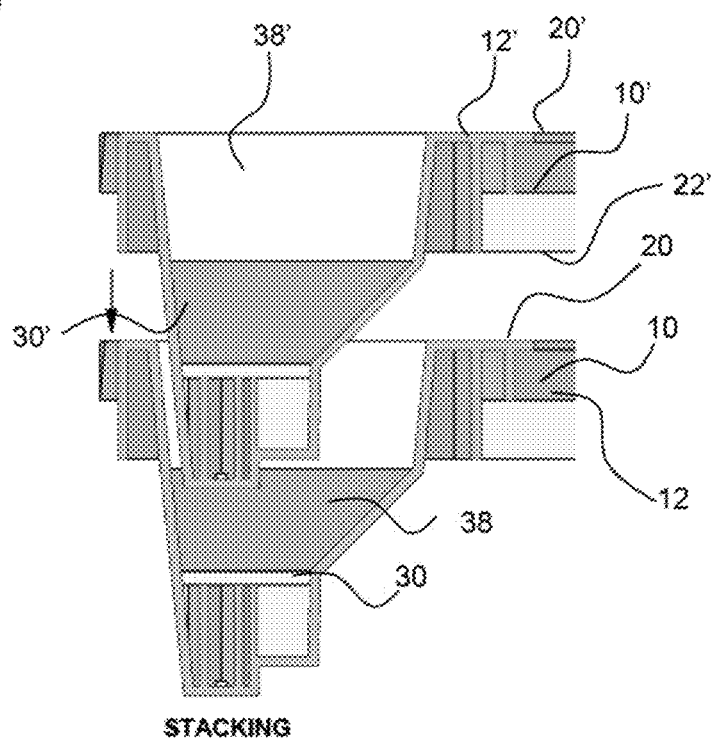

As shown in FIGS. 19 to 21, the feet 30 of a modular pallet 10 are configured with a foot well 38 to enable the foot 30' of a top modular pallet 10' to extend into the foot well 38 of a bottom modular pallet 10. As shown in FIG. 19, the stacked "add-on" height for each stacked modular pallet may be the height of the platform, which may be a fraction of the overall height of a modular pallet from the base of the foot to the top of the platform. As shown, the "add-on" height is 2 inches. The add-on height may be no more than half the modular pallet height, no more than one-third the modular pallet height, no more than about one-quarter the modular pallet height and any range between and including the height values provided. FIG. 18 shows a side view of two modular pallets stack one atop another to form a set of stacked modular pallets. FIG. 20 shows the two feet of stacked modular pallets nested together. FIG. 21 shows the foot 30' of a top modular pallet 10' being lowered into the foot well 38 of a lower modular pallet 10.

Figure 22:
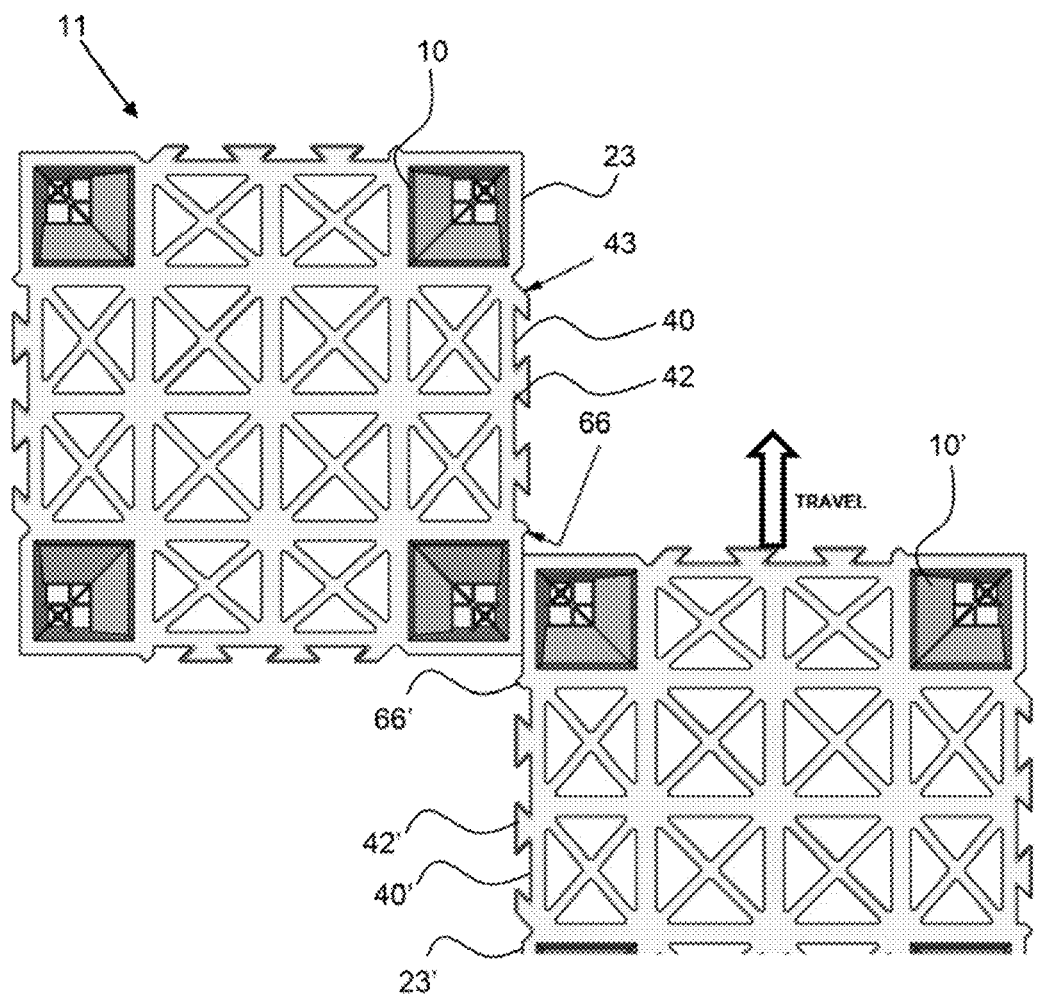
FIG. 22 shows a top view of exemplary modular pallets with one being slid along the side of the other and a bumper feature configured to prevent the interlocking features from catching on each other.

As shown in FIG. 22, a bumper feature 66 is configured opposing the partial dovetail 43 along the dovetail array 42. The bumper feature extends out from the side of the pallet platform, as does the partial dovetail, to prevent the modular pallets 10, 10' from catching on each other as they are slid or moved past one another. As shown, the second modular pallet 10' is being moved, such as being pushed by a fork truck, and the side 23' of a second modular pallet 10' is sliding along the side 23 of first modular pallet 10. When the side of second modular pallet reaches the bumper feature 66, it will be deflected away from the side of the first modular pallet, thereby preventing the interlocking features 40, 40' from catching on each other.

Figure 23:
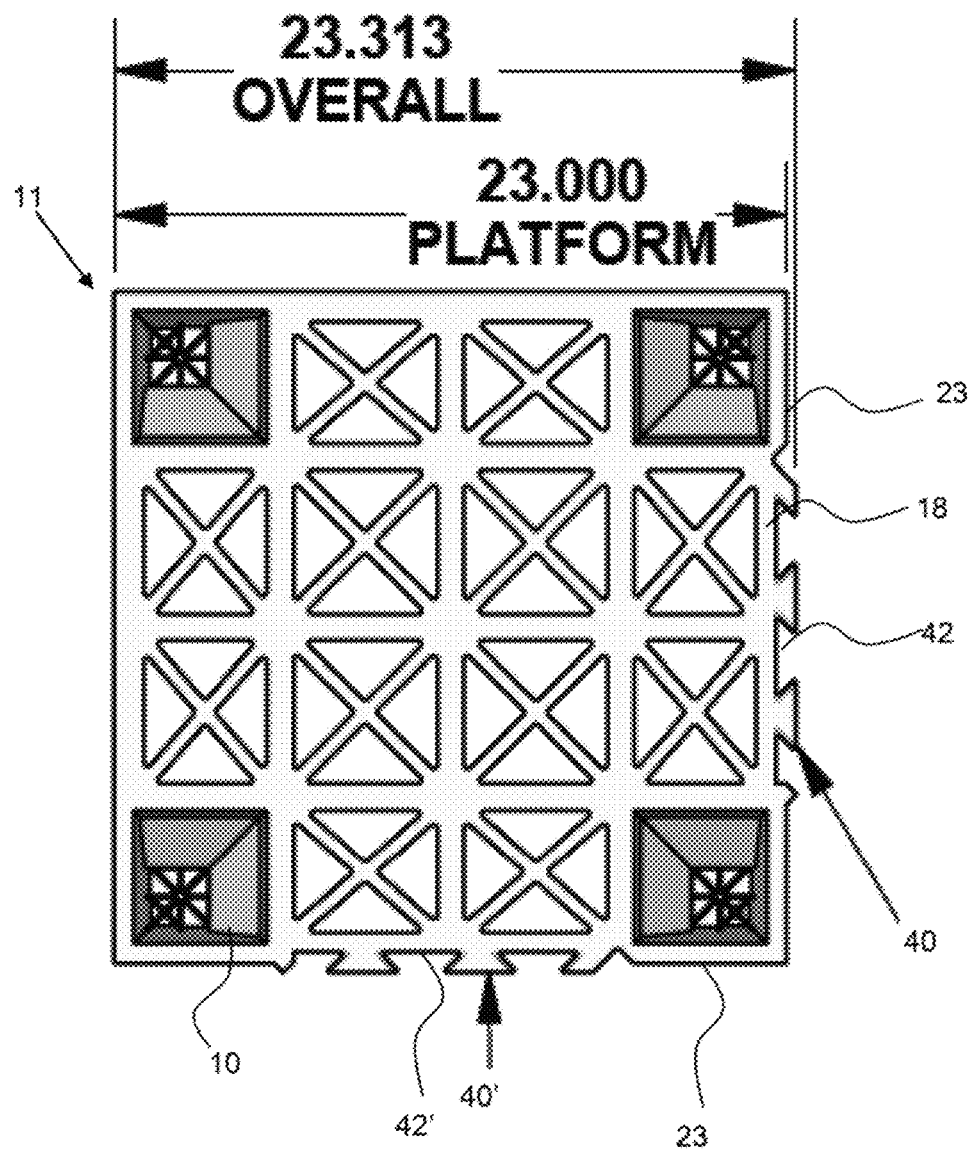
FIG. 23 shows a top view of an exemplary two-sided modular pallet.
Figure 24:
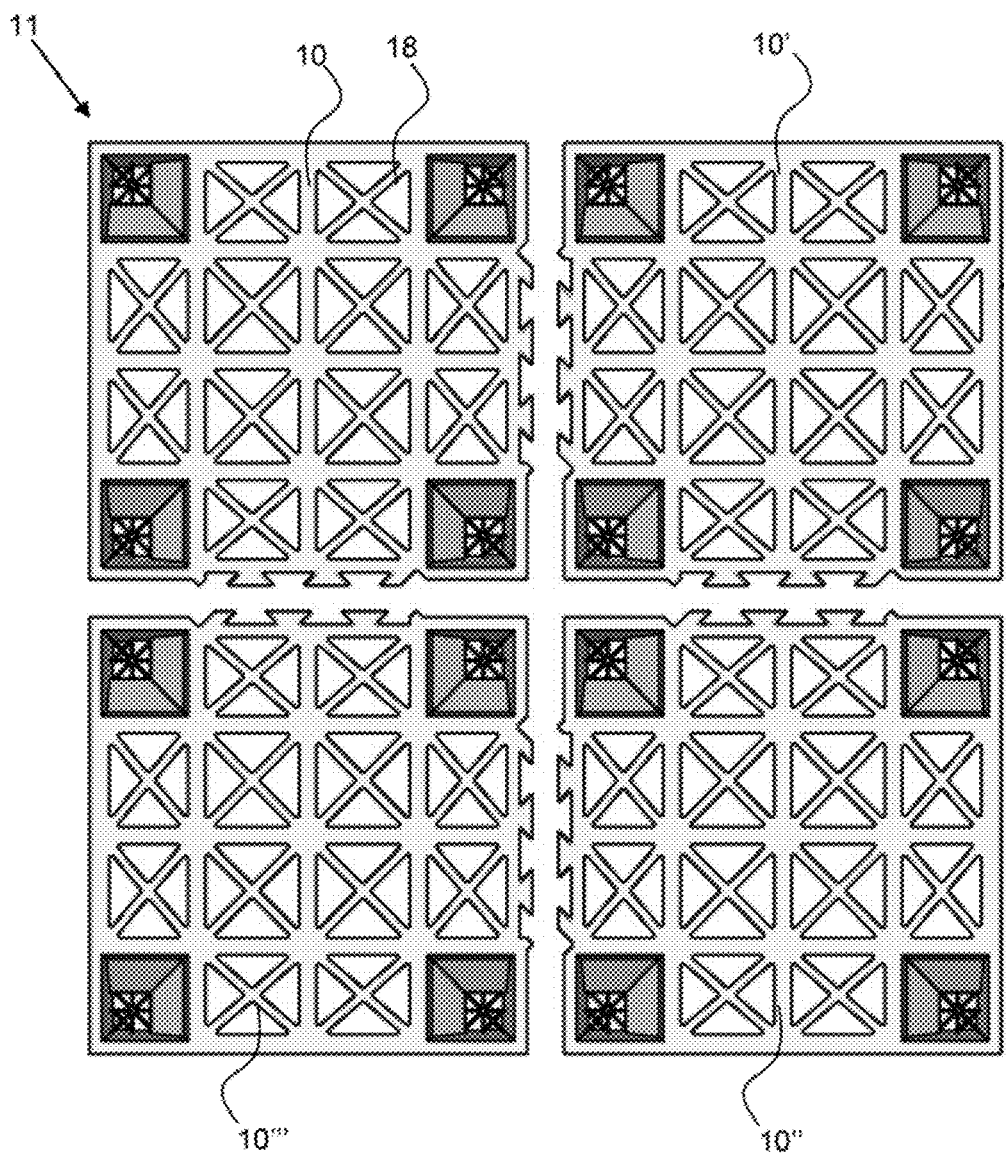
FIG. 24 shows four two-sided modular pallets configured for interlocking with each other.
Figure 25:
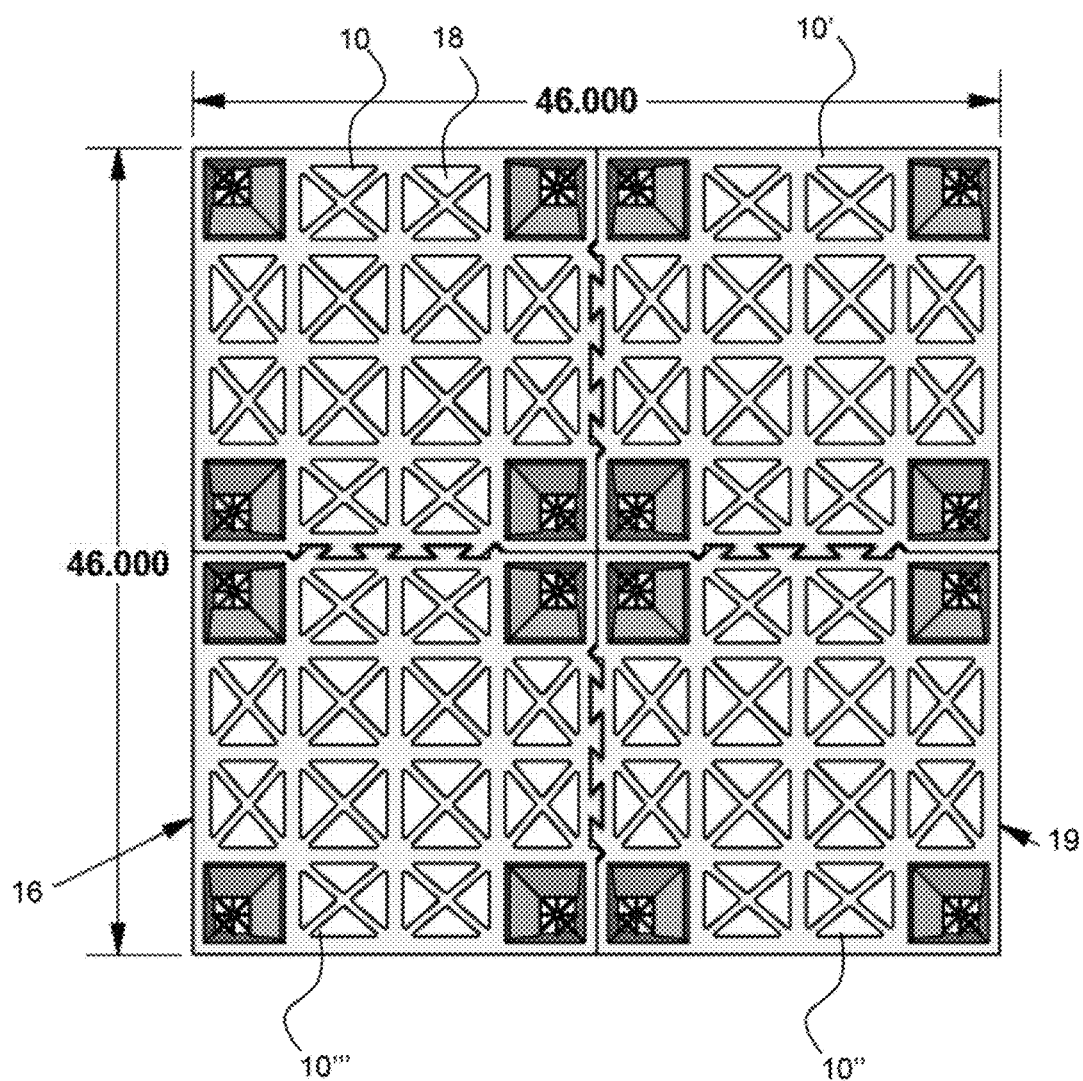
FIG. 25 shows a quad array of coupled pallets made up of four two-sided modular pallets.

Referring now to FIGS. 23 to 25, a modular pallet 10, may be a two-sided interconnecting modular pallet 18, having an interlocking feature 40, 40' on only two sides of the pallet. As shown, the interlocking features are on adjacent sides 23, 23' of the modular pallet and configured orthogonally to each other. This configuration enables a quad array of coupled pallets 16, as shown in FIG. 25. As shown in FIG. 24, four two-sided interconnecting modular pallet 18 have their interconnecting features aligned to make the quad array of coupled pallets 16 shown in FIG. 25.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A modular pallet system comprising:
   a) four modular pallets configured in a quad array of coupled pallets, each of said modular pallets comprising:
      i) a rectangular platform comprising:
         a top configured to receive a package thereon;
         a bottom;
         four sides;
         four corners;
      ii) an interlocking feature configured on each of the four sides of the platform, wherein each interlocking feature comprises a dovetail array comprising:
         a dovetail that flares outward from a top of the dovetail to a bottom of the dovetail;
         a dovetail recess that tapers from a top of the dovetail recess to a bottom of the dovetail recess;
         wherein each of the four sides has the same dovetail array to enable detachably attach of any of the four sides of a first modular pallet to any of the four sides of second modular pallet;
      iii) four feet configured proximal to the corners of the platform each of said feet comprising:
         a connected end;
         a foot base; and
         a cavity extending down from said rectangular platform to a said foot base;
         wherein the cavity forms a foot well configured to receive a foot of a second modular pallet that is stacked on a first modular to form stacked modular pallets;
      iv) a fork truck opening extending from the bottom of the platform to the base of the feet and configured to receive a fork of a fork truck;
      v) a hand truck notch configured on each of the four feet, wherein the hand truck notch extends horizontally from said foot and is configured up from the foot base and configured along the foot on each outer side of the foot and configured to receive a hand truck tongue to lift one of said plurality of modular pallets from the array of coupled pallets;
      wherein the quad array of coupled pallets forms four sides each with a pair of fort truck openings configured to receive forks of a fork truck therein to lift and move said quad array of coupled pallets;
      wherein a first modular pallet of the plurality of modular pallets is configured to detachably attach to a side of a second modular pallet having an interlocking feature by coupling the interlocking features of said first and second modular pallets, wherein the dovetail of the first modular pallet is configured for insertion into the dovetail recess of the second modular pallet.

2. The modular pallet system of claim 1, wherein the dovetail array is offset an offset distance from a center of a side of the modular pallet.

3. The modular pallet system of claim 1, wherein the rectangular platform is a square platform.

4. The modular pallet system of claim 3, wherein the dovetail array on each of the four sides of the modular pallet comprise at least two dovetails and two dovetail recesses.

5. The modular pallet system of claim 1, wherein the dovetail array on each of the four sides of the modular pallet comprise at least two dovetails and two dovetail recesses.

6. The modular pallet system of claim 1, wherein the interlocking feature has a depth and wherein a side extension extends down from the interlocking feature.

7. The modular pallet system of claim 6, wherein the side extension is planar.

8. The modular pallet system of claim 1, wherein the interlocking feature has a length and a center that is offset an offset distance from a center of a side of the modular pallet.

9. The modular pallet system of claim 1, wherein the interlocking feature extends out from the side of the pallet, wherein an extended end of the dovetail extends out from the side of the modular pallet.

10. The modular pallet system of claim 1, wherein dovetail recess tapers in a taper angle of no more than 10 degrees from vertical.

11. The modular pallet system of claim 1, wherein the dovetail flares out at a flare angle of no more than 10 degrees from vertical.

12. The modular pallet system of claim 1, wherein the dovetail of the first modular pallet is configured to be lowered into the dovetail recess of the second modular pallet to detachably attach the first modular pallet with the second modular pallet.

13. The modular pallet system of claim 1, wherein the length of the sides of the platform is no more than 1.5 m.

14. The modular pallet system of claim 1, wherein the length of the sides of the platform is no more than 1.0 m.

15. The modular pallet system of claim 1, wherein each of the plurality of modular pallets are a monolith being formed from single piece of material.

16. The modular pallet system of claim 1, wherein each of the plurality of modular pallets are molded from a single material.

17. The modular pallet system of claim 1, wherein each of the plurality of modular pallets are molded of plastic.

18. The modular pallet system of claim 1, wherein each of the feet has a drain hole in the base of the foot.

19. The modular pallet system of claim 1, wherein the bottom of the platform of the second modular pallet rests on the top of the platform of the first modular pallet when the first and second modular pallets are stacked to form said stacked modular pallets.

20. The modular pallet system of claim 1, further comprising a bumper feature configured on at least one side of the interlocking feature and wherein the bumper feature extends out from the side of the pallet platform.

\* \* \* \* \*